United States Patent [19]

Anderson et al.

[11] Patent Number: 4,789,215
[45] Date of Patent: Dec. 6, 1988

[54] FIBER OPTIC SWITCH WITH PRISM MOUNTED FOR RECIPROCAL AND ROTATIONAL MOVEMENT

[75] Inventors: John C. Anderson, Ottawa; John C. Goodwin, Nepean, both of Canada

[73] Assignee: Northern Telecom Limited, Montreal, Canada

[21] Appl. No.: 853,598

[22] Filed: Apr. 18, 1986

[51] Int. Cl.[4] .............................................. G02B 6/34
[52] U.S. Cl. .............................. 350/96.19; 350/96.16; 350/96.18; 350/96.20
[58] Field of Search ............... 350/96.15, 96.16, 96.20, 350/96.19, 96.18

[56] References Cited

U.S. PATENT DOCUMENTS

| 3,483,389 | 12/1969 | Cronin | 350/96.19 X |
| 4,322,126 | 3/1982 | Minowa et al. | 350/96.20 |
| 4,398,791 | 8/1983 | Dorsey | 350/96.18 |
| 4,556,280 | 12/1985 | Bagby | 350/96.20 X |
| 4,705,349 | 11/1987 | Reedy | 350/96.15 |

FOREIGN PATENT DOCUMENTS 55-142302  11/1980  Japan.

OTHER PUBLICATIONS

Watanabe et al., "1×2 Optical Switch Using New Type of Pentagonal Prism", *Electronics Letters*, vol. 16, No. 7, Mar. 27, 1980, pp. 257-259.

Primary Examiner—John D. Lee
Attorney, Agent, or Firm—S. L. Wilkinson; C. W. Junkin

[57] ABSTRACT

An optical switch has a reciprocating prism. In one position of the prism, light passes from an input fiber, through a collimating lens, directly to a focussing lens and then into an output fiber. In another prism position, the collimated light is incident on the prism, is deflected by the prism and enters a different focussing lens and output fiber. Coaxially aligned with the lenses are respective precision molded conical recesses which flare outwardly to receive the precision ground conical ends of fiber terminations.

13 Claims, 3 Drawing Sheets

FIG. 3,4

FIBER OPTIC SWITCH WITH PRISM MOUNTED FOR RECIPROCAL AND ROTATIONAL MOVEMENT

This invention relates to a fiber optic switch for use in optical communications. For use in local area networks (LANs) there is a need for an optical switching device which can operate normally as a passive transmission device but which also permits injection of an optical signal or tapping of an optical signal when desired at the switch site.

A known optical switching device for use in optical fiber systems is proposed by Nippon Electric Company Limited in U.S. Pat. Nos. 4,239,331 and 4,322,126. In the switch a plurality of input optical fibers are coupled to the input side of a mechanical switching device for receiving incoming light beam signals. Individually associated with each optical fiber is an input collimating lens which is positioned to receive the incoming light beam and to convert it into a collimated light beam. A pentaprism is disposed at an output end of the lenses for switching the output paths of collimated parallel light beams emerging from the lenses. Light emitted by the pentaprism is focussed at a plurality of output optical fibers by associated focussing lenses. An electromechanical switch is used selectively to insert the pentaprism into or remove it from, the optical paths of light passing from the input to the output fibers.

For installation into a fiber optic system, the input and output fibers are implemented as pigtail fibers and are terminated by precision ground connector terminations adapted to seat within a precision molded seating member. When the switch device is installed in a fiber optic LAN, the input and output fibers of the LAN are also terminated with precision ground terminations. Connections are made by inserting respective terminations into the seating member. Suitable termination and seating members are described in U.S. Pat. No. 4,107,242 (Runge). A fiber optic switch with fewer precision parts is now proposed.

According to one aspect of the invention, there is provides an optical switch comprising a housing, a prism movably mounted within the housing, for reciprocal movement along an axis of reciprocal movement between first and second positions and for rotational movement about said axis of reciprocal movement, means for adjustably rotating the prism about said axis of reciprocal movement, and a plurality of lenses mounted in the housing and distributed around the axis of reciprocal movement, the lenses having coplanar longitudinal axes wherein in the first position of the prism, light collimated by a first lens passes directly into a second lens, and in the second position of the prism, light collimated by said first lens is directed into the prism, is deflected thereby and after exiting the prism, enters a third lens.

Preferably four such lenses are arranged symmetrically around the lens position, as two pairs of lenses, the lenses of each pair being coaxial and located at opposite sides of the prism, the axis of the lens pairs being mutually perpendicular to one another and to the reciprocating direction of the prism. For such an arrangement a triangular prism with a single mirrored surface or a pentaprism with two mirrored surfaces can be used to achieve a right angle deflection of an input light beam. The prism can be mounted on a plate attached to a plunger of an electrically driven solenoid. The plate can include a vertical keyway engaging adjustment screws mounted within the housing, the screws having cam-shaped ends whereby on rotation of the screws, incremental rotation of the prism about a vertical axis is achieved. The conical recesses can be formed within plates which are screw attached to the housing in positions in which the conical recesses and respective graded index lenses are axially aligned.

An embodiment of the invention will now be described by way of example with reference to the accompanying drawings in which.

Figure 1:
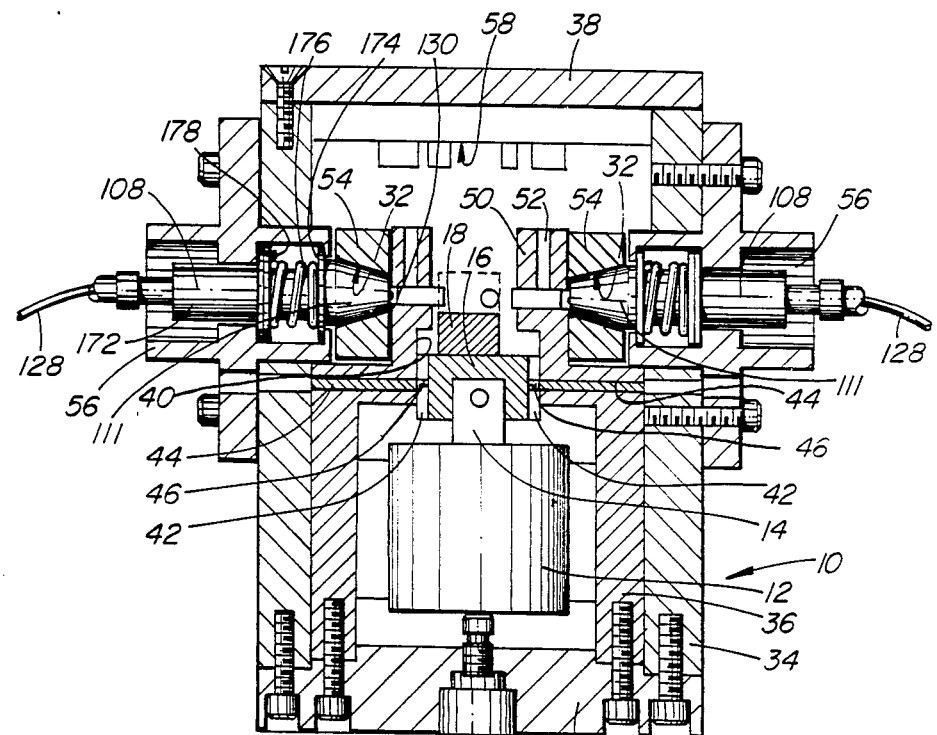
FIG. 1 is a vertical section through a fiber optic switch according to the invention.

Referring in detail to the drawings, there is shown a housing 10 within which is mounted a solenoid 12. A plunger 14 of the solenoid is attached to a plate 16 which supports a prism 18 whereby the prism can be moved from a low position shown in full line in FIG. 1 to an upper position shown in broken line. In the lower position, light can pass from an input lens 20 to an output lens 22 and from an input lens 24 to an output lens 26. In the upper position, light emitted from the input lens 20 is deflected by reflection and refraction within the triangular prism 18 and enters the lens 26. In terminated fibers 128 are plugged into conical recesses 32 in positions coaxial with respective lenses.

The housing 10 has an octagonal outer container 34 and an inner cylindrical liner 36 with top and bottom plates 38. The solenoid 12 is securely mounted within the cylindrical liner 36 by set screws. The plunger 14 exiting the top of the solenoid 12 is secured to the prism-supporting plate 16. The plate 16 is circular and seats within a circular bore 40 within the liner 36. The plate 16 has channels 42 running vertically along its outside surface. Into the channels project adjustment screws 44 which have cam formations 46 at their ends whereby when the screws are turned, the plate 16 is rotated incrementally within the cylindrical bore 40.

Figure 2:
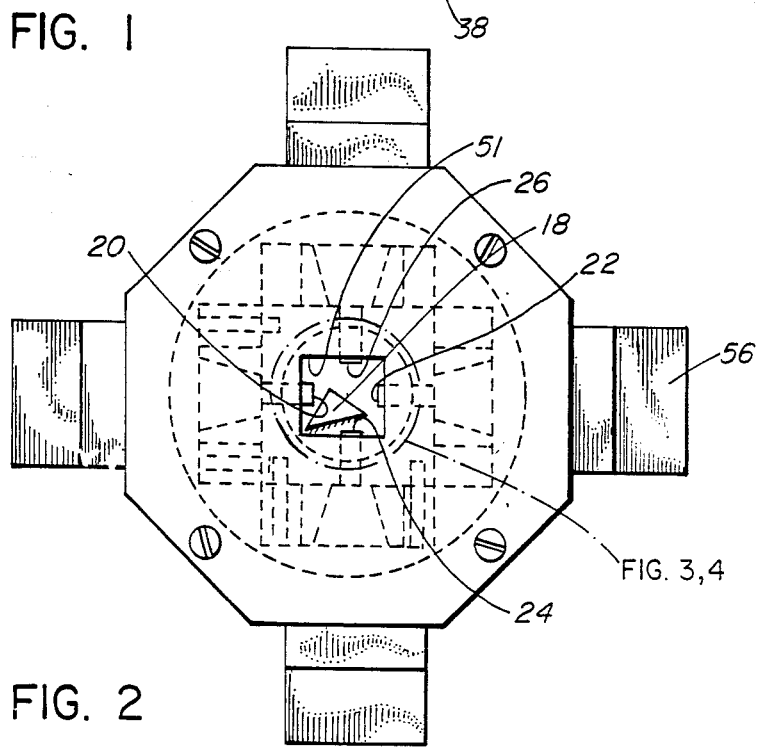
FIG. 2 is a plan view of the switch of FIG. 1.
Figure 4:
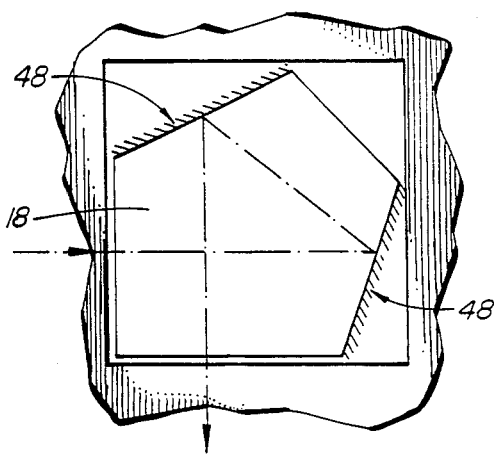
FIG. 4 shows an optical path through a pentaprism.
Figure 3:
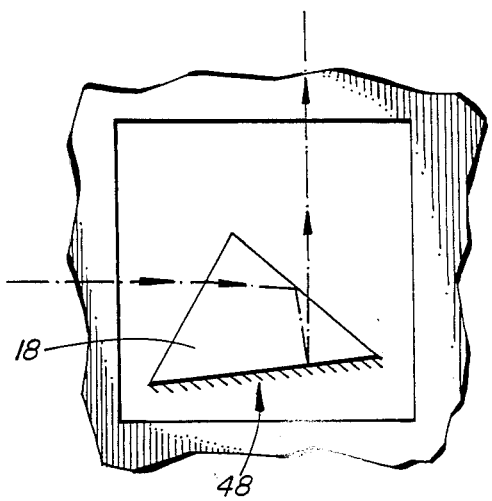
FIG. 3 shows an optical path through a triangular prism.

The prism is a triangular silica glass prism having a single silvered side 48. As shown in FIG. 3, the orientation and internal angles of the prism 18 are such as to intercept light from the lens 20 and to turn that light towards the output lens 26 (FIG. 2). Other prisms such as a pentaprism (FIG. 4) can be used to achieve the desired deflection of the input beam.

The lenses are graded index lenses e.g. Selfoc ® lenses mounted in horizontal bores extending through a top part 50 of the liner 36 which defines a square section aperture 51. Bores 52 are formed to terminate at the lens mounting bores whereby epoxy can be injected once the lenses are in place to anchor the lenses in desired positions. Screw mounted to the outer surface of the square top section of the liner 36 are plates 54, each plate having one of the conical recesses 32 extending through it. The axes of the lenses, the conical recesses and bulkhead members 56 which are screw mounted within apertures in the outer octagonal housing 34 are coaxial. Mounted in a top part of the switch is an electrical control circuit 58 for the solenoid 12.

As shown in section in FIG. 1, each fiber termination has a terminating plug 108 with a frusto-conical end part 111. The fiber end projects slightly beyond the end of the plug to terminate at a raised pip 130 at which the fiber end is polished. The plugs 111 bear against respective conical recesses in the accurately molded plates 54. The plugs are locked within members 56 by a pair of spaced C-rings 172, 174 which lock into grooves in the plug 108. A compression spring 176 surrounding the plug and extending between C-rings 174 and an internally projecting flange 178 serves to bias the plug into the conical recess 32.

Figure 5:
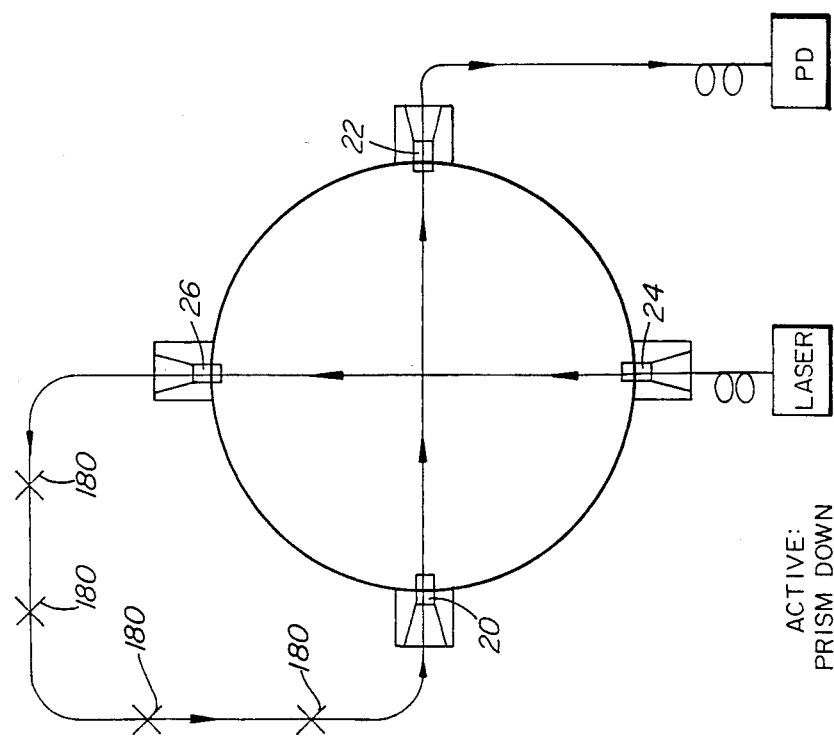
FIG. 5 is a schematic view showing the switch positioned in a local area network (LAN).
Figure 5:
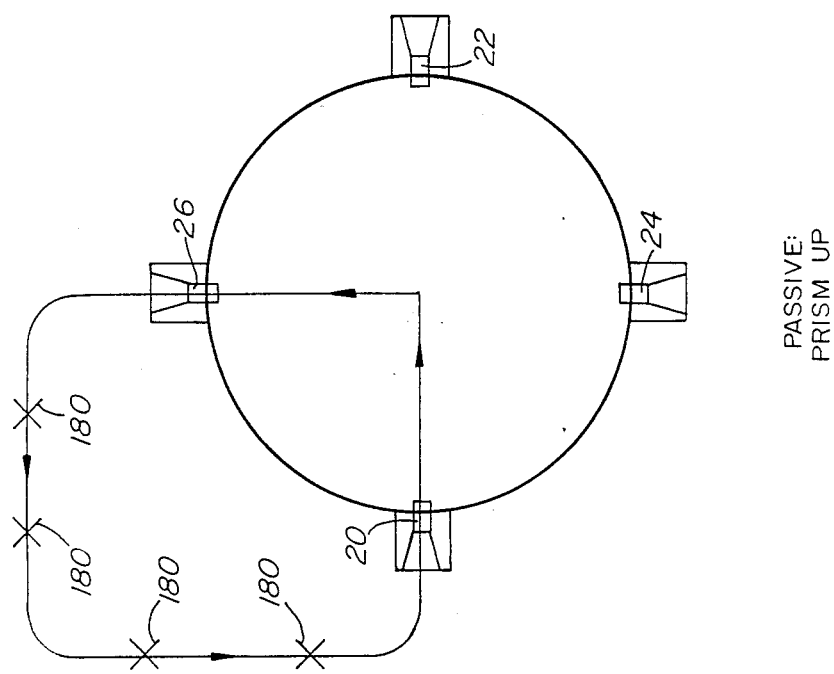

In use, in a typical LAN application shown in FIG. 5, the switch is one of a plurality of such switches 180 distributed around a LAN fiber around which optically encoded data passes in an anticlockwise direction. The LAN fiber is terminated at lenses 20 and 26. In a passive mode, i.e. when light is merely passing through the switch node and is neither being detected nor injected there, the prism is maintained in its upper position. Light from the LAN fiber is collimated at lens 20 is directed upwardly (as illustrated) by the prism 18 and is focussed by lens 26 on the input end of the LAN fiber. When in an active mode, the prism is lowered and light from the LAN passes directly from the collimating lens 20 into lens 22 which is connected via a pigtail fiber to a photodetector (PD). Similarly, light from a light source such as a semiconductor laser attached to a pigtail fiber passes from the pigtail fiber into the lens 24, across the switch to the focussing lens 26 and then into the input end of the LAN fiber. It will be appreciated that other configurations are possible. Thus in the passive mode, the light within the LAN can pass directly between two lenses. The prism is then used in the active mode to turn the source light into the input end of the LAN fiber and to turn received light from the LAN fiber output end toward the detector. Additionally, the switch can be implemented with a different number of input and output ports each characterized by a lens and a conical recess. In the latter case prisms are used which turn the optical beam through less than or more than a 90° angle.

What is claimed is:

1. An optical switch comprising a housing, a prism movably mounted within the housing for reciprocal movement along an axis of reciprocal movement between first and second positions and for rotational movement about said axis of reciprocal movement, means for adjustably rotating the prism about said axis of reciprocal movement, and a plurality of lenses mounted in the housing and distributed around the axis of reciprocal movement, the lenses having coplanar longitudinal axes wherein in the first position of the prism, light collimated by a first lens passes directly into a second lens, and in the second position of the prism, light collimated by said first lens is directed into the prism, is deflected thereby and after exiting the prism, enters a third lens.

2. An optical switch as claimed in claim 1 in which the prism is a triangular prism having a single mirrored surface.

3. An optical switch as claimed in claim 2 wherein said prism is oriented so that in the second position of the prism light is totally internally reflected from one face of the prism onto the mirrored surface and from the mirrored surface to the third focussing lens.

4. An optical switch as claimed in claim 1 wherein the prism is mounted on a plate, a solenoid has a plunger attached to the plate, and the solenoid is operable to vertically move the plate.

5. An optical switch as claimed in claim 4 including a keyway within the plate, wherein the means for adjustably rotating the prism comprises a cam engaging within the plate keyway, and means for rotating the cam to rotate the plate about an axis perpendicular to the plane containing longitudinal axes of the lenses.

6. An optical switch as claimed in claim 1 further comprising a plurality of conical recesses within the housing at the outer end of each of the lenses, said recesses flaring in a direction away from the prism to receive therein conical fiber terminations, and means for securing the conical fiber terminations in respective recesses, wherein said flared recesses are formed within respective precision molded plates which are attached to a frame member within which the lenses are mounted.

7. An optical switch as claimed in claim 1 further comprising a plurality of fiber termination holders mounted within apertures within said housing, the fiber termination holders positioned to hold fiber terminations with conical end plugs thereof seated within respective conical recesses.

8. An optical switch as claimed in claim 1 wherein the lenses are graded index lenses.

9. An optical switch as claimed in claim 1 wherein in the first position of the prism, light collimated by a fourth focussing lens passes directly into the third collimating lens.

10. An optical switch as defined in claim 9 located in a station in a LAN wherein at one position of the prism the switch couples the station into the LAN and at another position of the prism the switch causes the LAN to bypass the station.

11. An optical switch comprising:
a housing;
a prism support member movably mounted to the housing for reciprocal movement along an axis of reciprocal movement and for rotational movement about said axis of reciprocal movement, the prism support member having a keyway extending parallel to the axis of reciprocal movement;
a cam engaging the keyway;
means for moving the cam to adjustably rotate the prism support member about said axis of reciprocal movement;
a prism fixed to the prism support member;
a plurality of lenses mounted to the housing and distributed around the axis of reciprocal movement, the lenses having coplanar longitudinal axes; and
means for moving the prism support member along the axis of reciprocal movement to move the prism between first and second positions wherein in the first position of the prism, light collimated by a first lens passes directly into a second lens, and in the second position of the prism, light collimated by said first lens is directed into the prism, is deflected thereby and after exiting the prism, enters a third lens.

12. An optical switch as defined in claim 11, wherein the means for moving the cam to adjustably rotate the prism support member comprises an adjustment screw threaded through the housing and carrying the cam at one end thereof projecting into the keyway, rotation of the adjustment screw moving the cam within the keyway to rotate the prism support member about said axis of reciprocal movement.

13. An optical switch as defined in claim 11, wherein the means for moving the prism support member along said axis of reciprocal movement comprises a solenoid having a plunger attached to the prism support member.

* * * * *